United States Patent
Lee et al.

(10) Patent No.: US 10,393,400 B2
(45) Date of Patent: Aug. 27, 2019

(54) EVAPORATIVE COOLER AND OPERATING METHOD FOR EVAPORATIVE COOLER

(71) Applicant: KYUNGDONG NAVIEN CO., LTD., Pyeongtaek-si (KR)

(72) Inventors: Dong Keun Lee, Seoul (KR); Won Jae Jin, Seoul (KR)

(73) Assignee: KYUNGDONG NAVIEN CO., LTD., Pyeongtaek-si (KR)

( * ) Notice: Subject to any disclaimer, the term of this patent is extended or adjusted under 35 U.S.C. 154(b) by 0 days.

(21) Appl. No.: 15/757,627

(22) PCT Filed: Sep. 1, 2016

(86) PCT No.: PCT/KR2016/009778
§ 371 (c)(1),
(2) Date: Mar. 5, 2018

(87) PCT Pub. No.: WO2017/043806
PCT Pub. Date: Mar. 16, 2017

(65) Prior Publication Data
US 2018/0245815 A1  Aug. 30, 2018

(30) Foreign Application Priority Data
Sep. 9, 2015  (KR) .......... 10-2015-0127799

(51) Int. Cl.
| | |
|---|---|
| *F24F 3/16* | (2006.01) |
| *F24F 5/00* | (2006.01) |
| *F24F 11/30* | (2018.01) |
| *F24F 11/61* | (2018.01) |
| *F24F 12/00* | (2006.01) |

(52) U.S. Cl.
CPC .......... *F24F 12/006* (2013.01); *F24F 5/0035* (2013.01); *F24F 11/30* (2018.01); *F24F 11/61* (2018.01); *F24F 2003/1667* (2013.01); *Y02B 30/563* (2013.01)

(58) Field of Classification Search
CPC .... F24F 12/006; F24F 3/14; F24F 7/08; F24F 1/48; F24F 2001/0092; F24F 12/001
See application file for complete search history.

(56) References Cited

U.S. PATENT DOCUMENTS

| | | | |
|---|---|---|---|
| 6,338,258 B1* | 1/2002 | Lee .................. | F24F 5/0035 62/121 |
| 2017/0276383 A1* | 9/2017 | Gilbert .............. | F28F 3/08 |

FOREIGN PATENT DOCUMENTS

| | | |
|---|---|---|
| JP | 11294788 A | 10/1999 |
| JP | 2015152182 A | 8/2015 |
| KR | 100717133 B1 | 5/2007 |
| KR | 20080083940 A | 9/2008 |

(Continued)

OTHER PUBLICATIONS

International Search Report of PCT/KR2016/009778, Nov. 9, 2016, English translation.

*Primary Examiner* — Elizabeth J Martin
(74) *Attorney, Agent, or Firm* — STIP Law Group, LLC

(57) ABSTRACT

An evaporative cooler which has a main body that has an air supply inlet, an air supply outlet, a bleeding inlet, and a bleeding outlet; and a heat exchange unit. An air supply passage and a bleeding passage are spatially separated from each other to prevent fluid passing through the bleeding passage from being introduced to indoors via the air supply passage.

9 Claims, 9 Drawing Sheets

(56) References Cited

FOREIGN PATENT DOCUMENTS

KR  1020110100436 A   9/2011
KR    20120121776 A  11/2012

* cited by examiner

[FIG. 1]
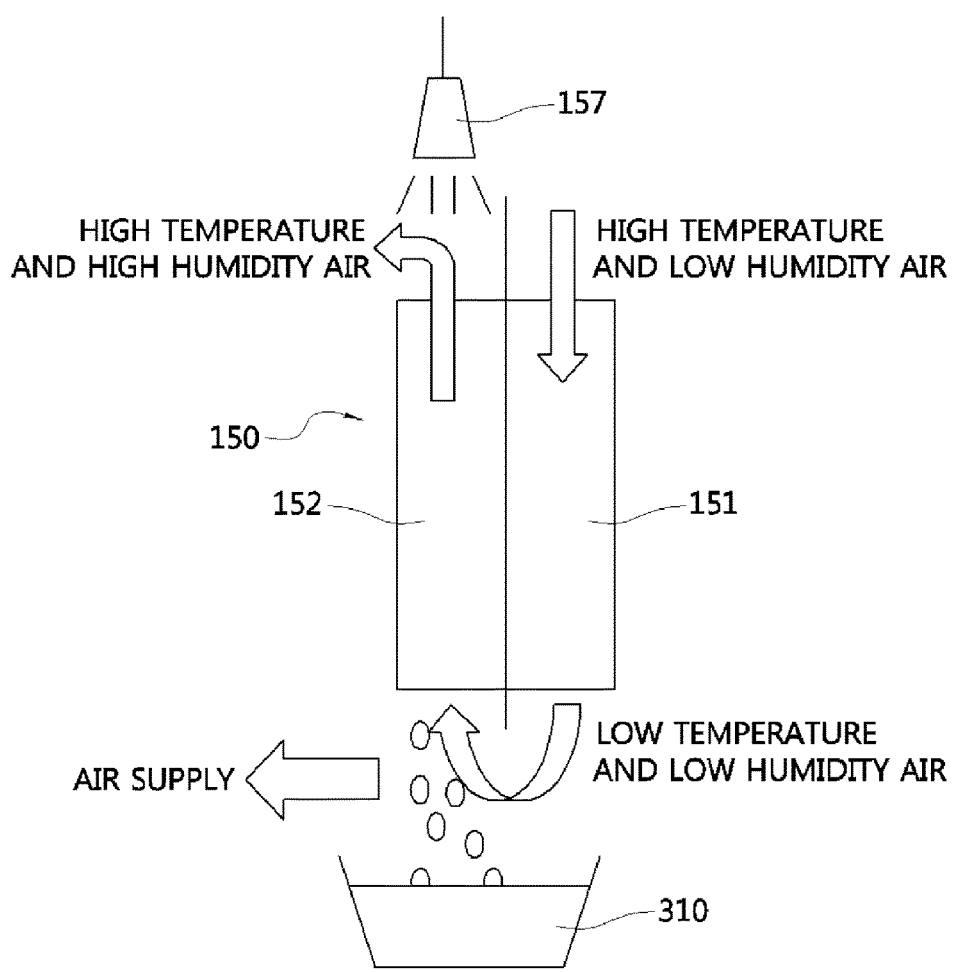
PRIOR ART

[FIG. 2]
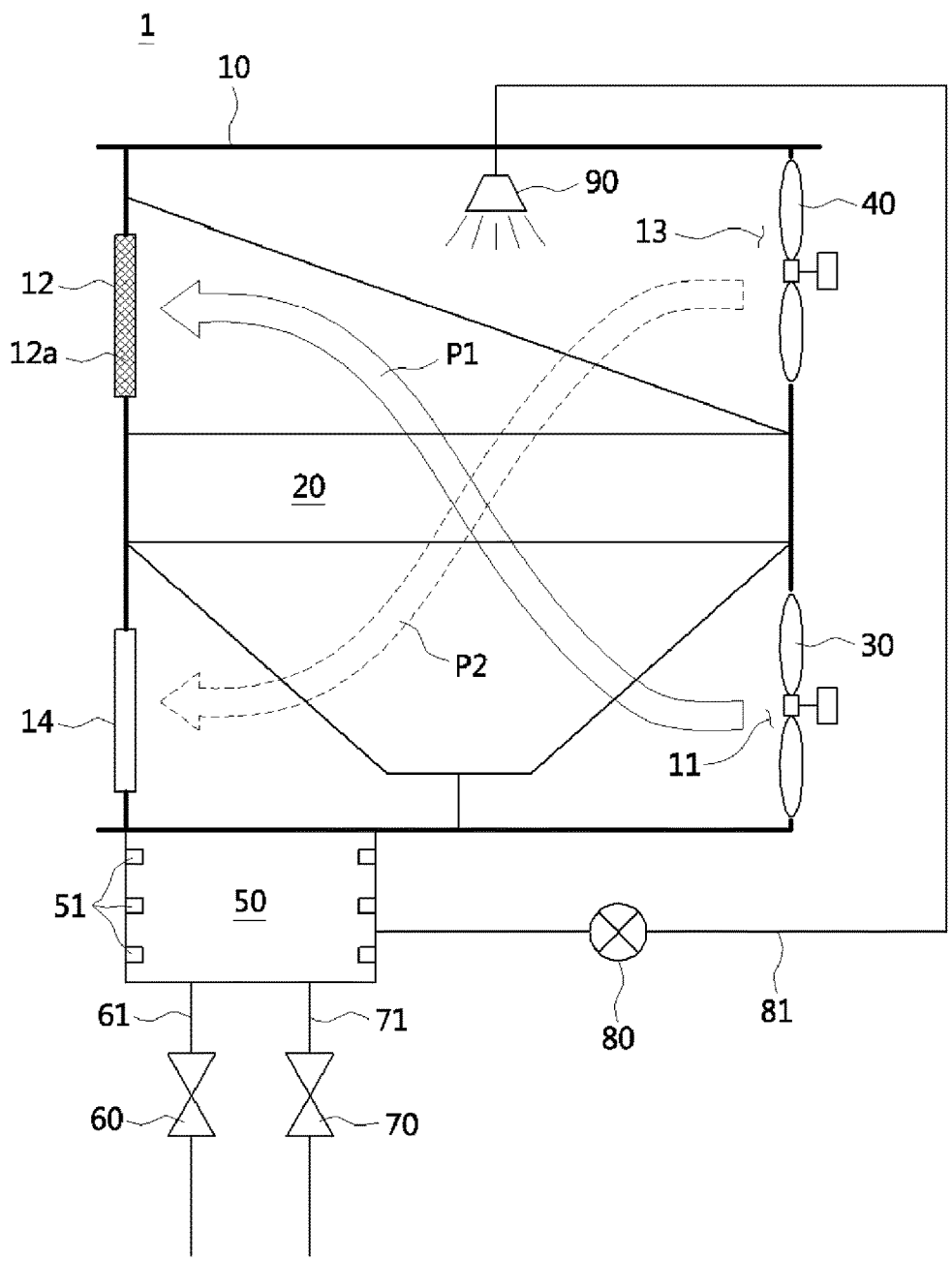

[FIG. 3]
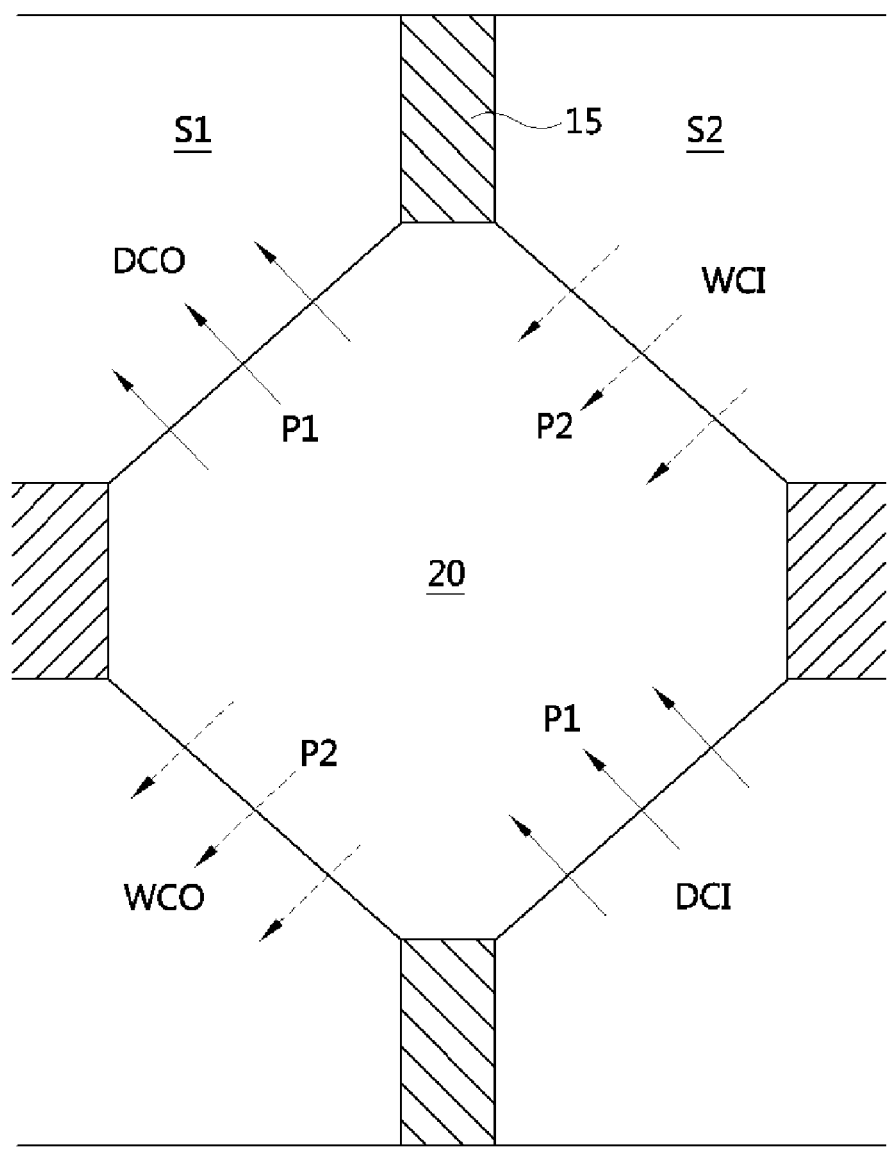

[FIG. 4]
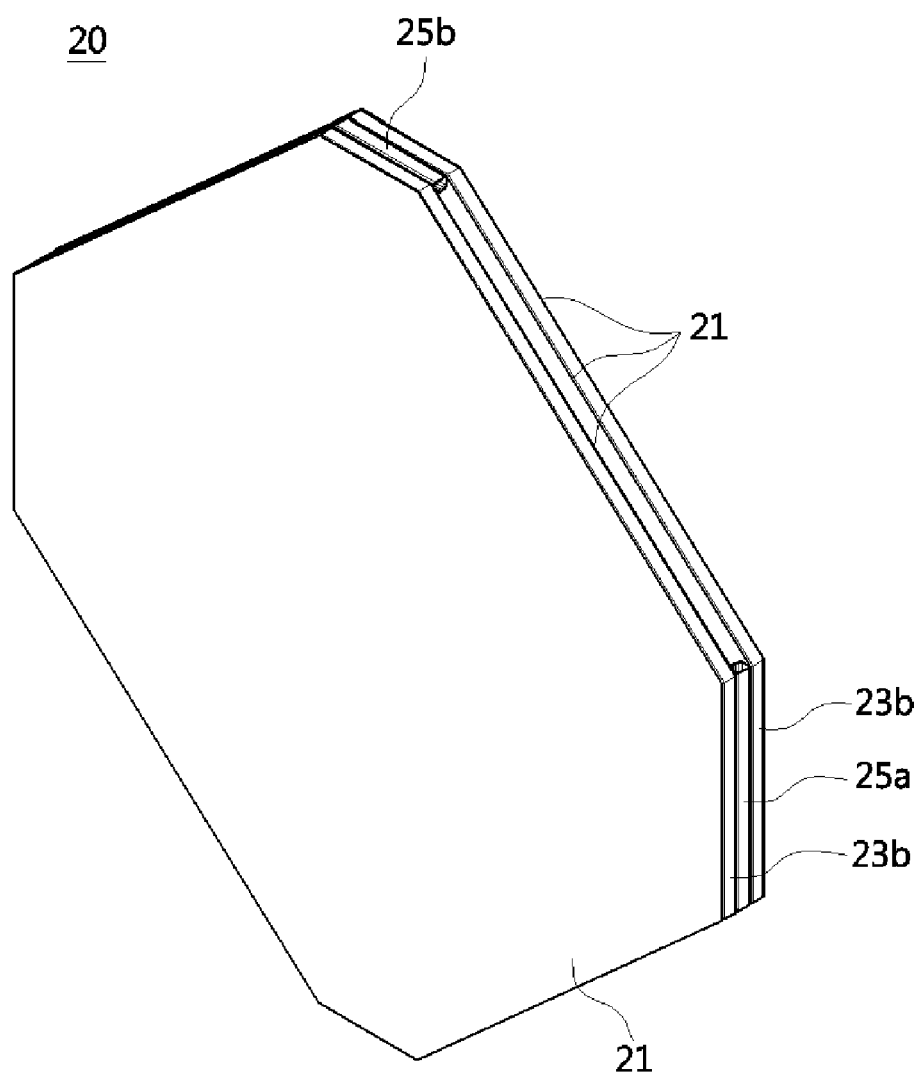

[FIG. 5]
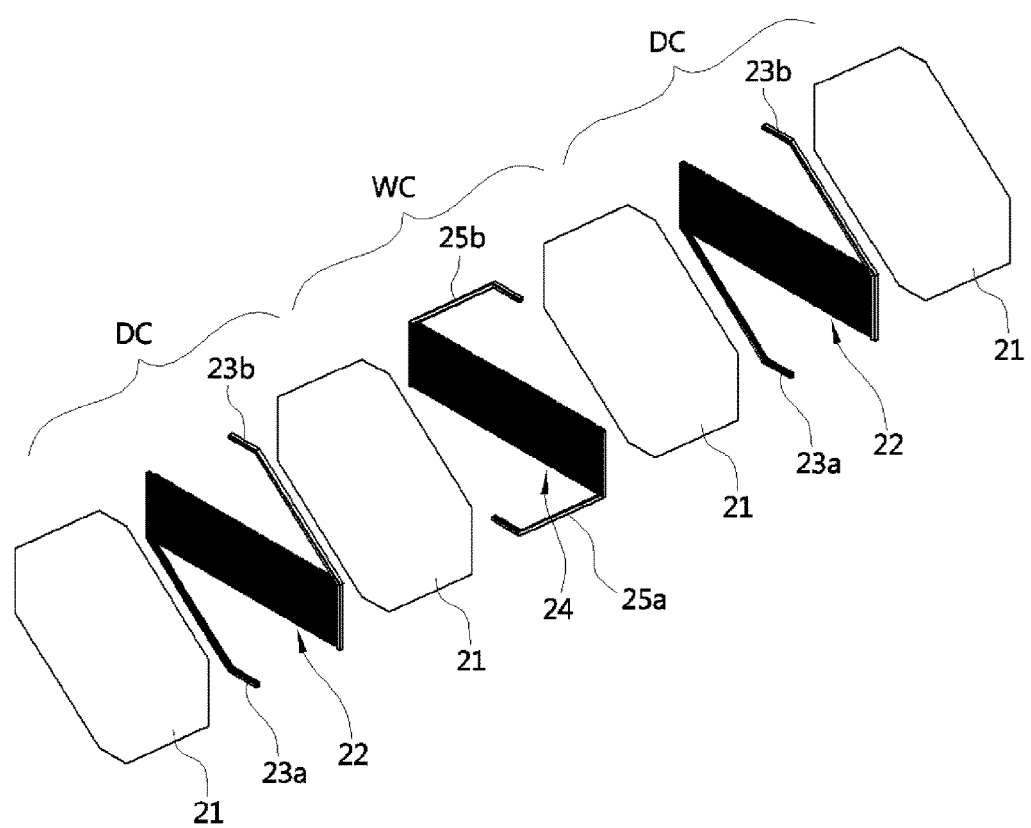

[FIG. 6]
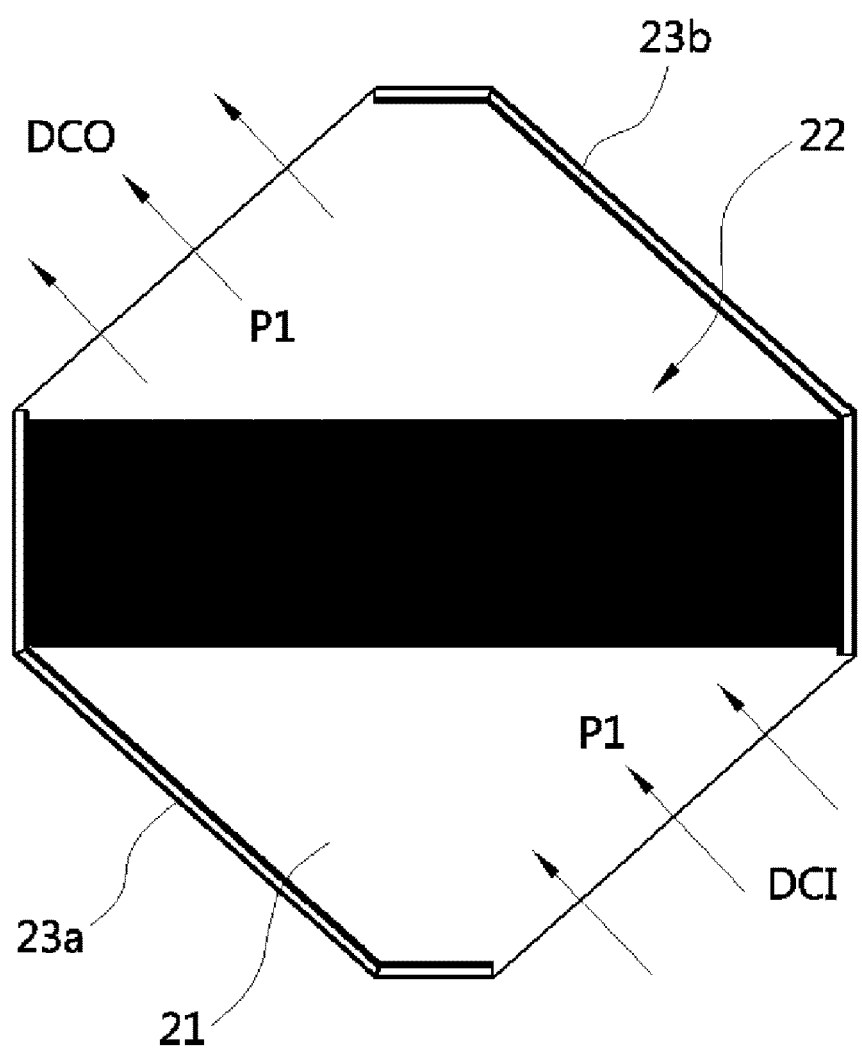

[FIG. 7]
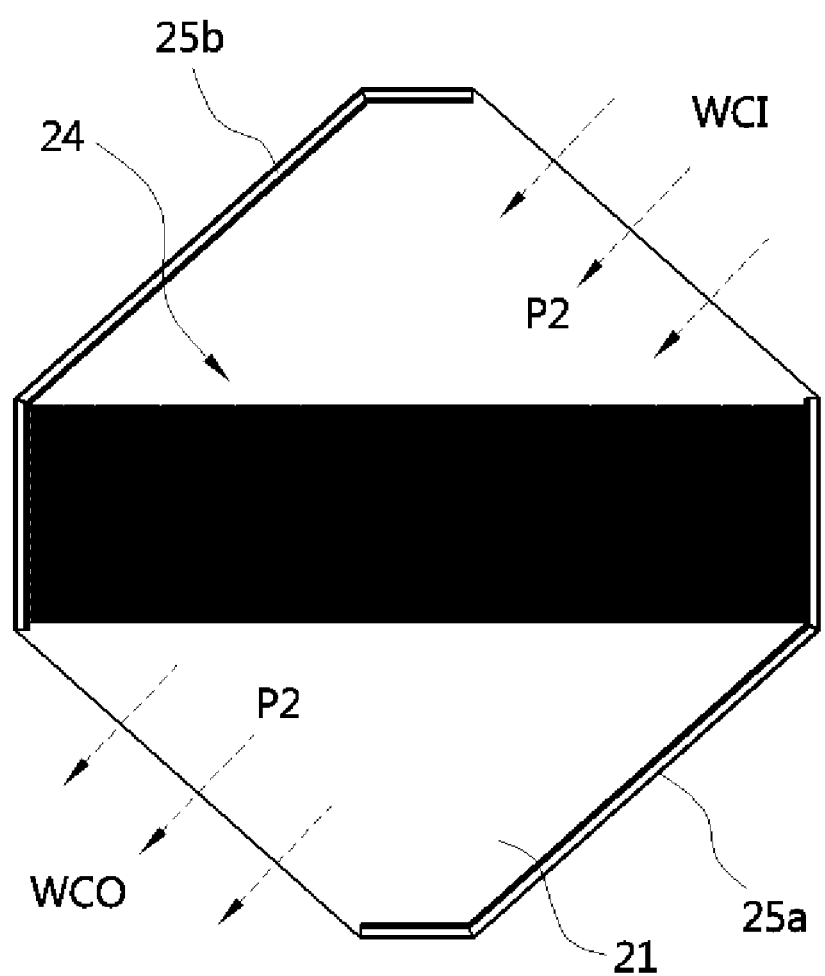

[FIG. 8]
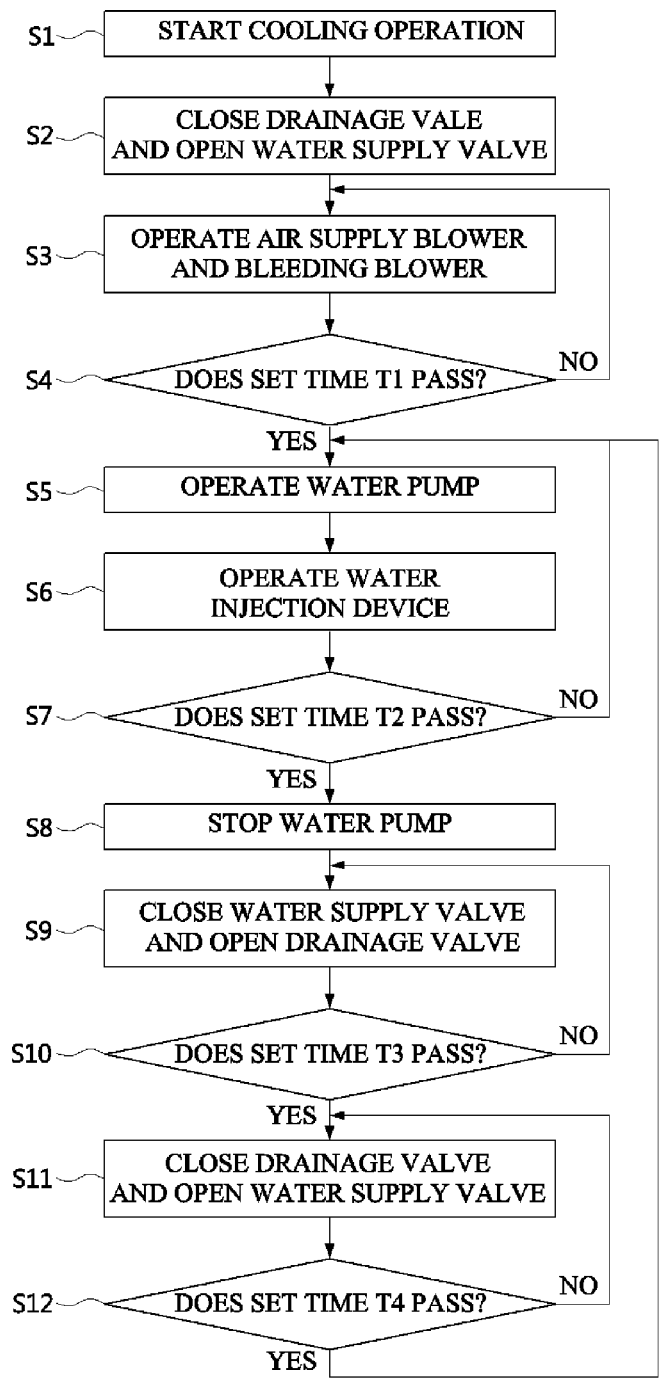

[FIG. 9]
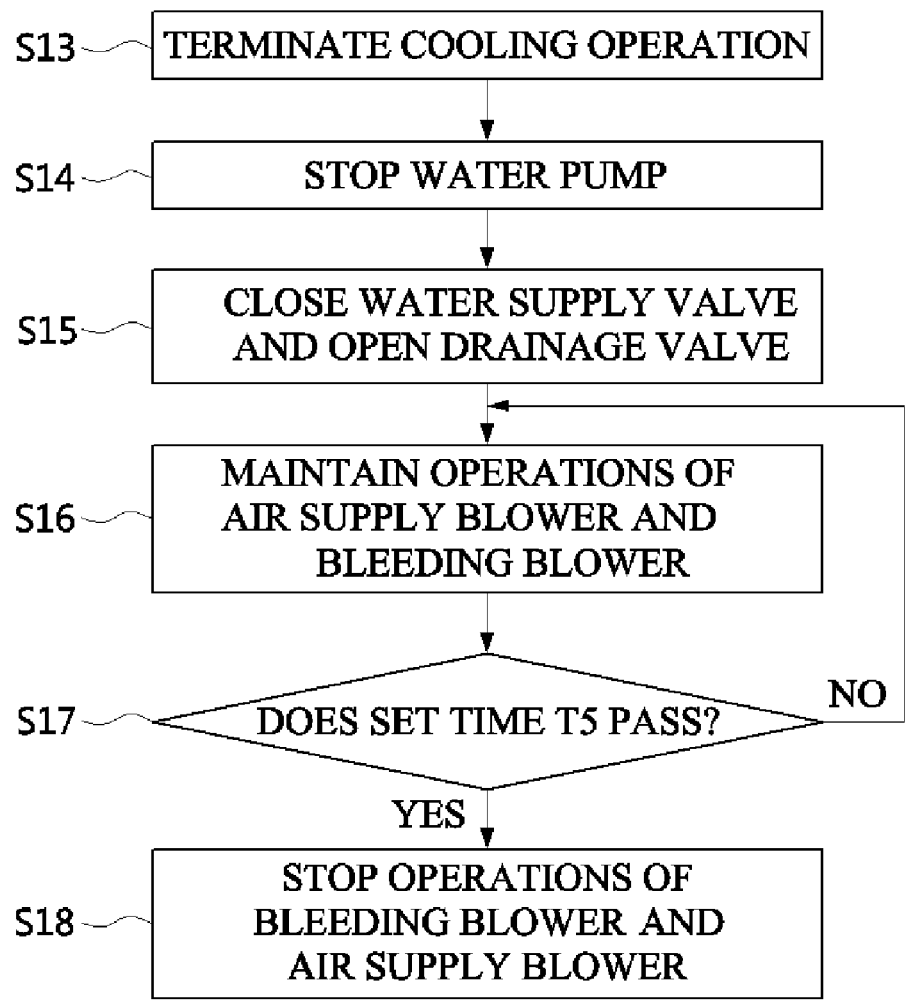

EVAPORATIVE COOLER AND OPERATING METHOD FOR EVAPORATIVE COOLER

CROSS-REFERENCE TO RELATED APPLICATIONS

This application is the U.S. National Phase under 35 U.S.C § 371 of International Application No. PCT/KR2016/009778 filed on Sep. 1, 2016, which in turn claims the benefit of Korean Application No. 10-2015-0127799, filed on Sep. 9, 2015, the disclosures of which are incorporated by reference into the present application.

TECHNICAL FIELD

The present invention relates to an evaporative cooler and an operating method for an evaporative cooler, and more particularly, to an evaporative cooler and an operating method for an evaporative cooler which are capable of preventing contamination of indoor air by blocking contaminated evaporative water and evaporative air from flowing into an interior and preventing bacterial growth in the evaporative cooler.

BACKGROUND ART

An air conditioner, which is a commonly used cooling and dehumidifying device, uses a refrigerant and is recognized as a main cause of the destruction of the ozone layer and global warming which are caused by a leakage of the refrigerant. In consideration of a problem of the use of such a refrigerant, energy ventilation devices for reducing a ventilation load through sensible heat transfer and latent heat transfer between indoor exhaust air and outdoor intake air have been developed.

However, conventional ventilation devices have a problem in that a recovery rate of latent heat is significantly lower than that of sensible heat such that the conventional ventilation devices cannot respond to an increase in cooling load. A regenerative evaporative cooling technique has been developed in consideration of the problem of the conventional energy ventilation devices.

The regenerative evaporative cooling technique lowers a temperature of air using an evaporative cooling effect of water and has advantages capable of resolving a problem of a conventional air conditioner and sufficiently reducing a cooling load since no refrigerant other than water is used.

An evaporative cooler is configured such that a wet channel and a dry channel are continuously repeatedly formed, and air is cooled through heat exchange due to evaporation in the wet channel and is supplied into an interior via the dry channel.

As a prior art related to the described above, FIG. 1 illustrates a block diagram of an evaporative cooler provided in a dehumidifying cooling apparatus disclosed in Korean Registered Patent No. 10-1229676.

A conventional evaporative cooler 150 is configured such that a portion of low-temperature dry air passing through a dry channel 151 is supplied to an interior and the remaining portion of the low-temperature dry air passing through the dry channel 151 passes through a wet channel 152, water is sprayed onto the wet channel 152 from a water injection device 157, the water sprayed onto the wet channel 152 is evaporated to absorb latent heat, and the evaporative latent heat undergoes a heat exchange with the dry channel 151 to cool air passing through the dry channel 151.

Further, the conventional evaporative cooler 150 is configured such that the water which is not evaporated at the wet channel 152 drops onto a drain plate 310, is collected at the drain plate 310, and then is circulated and supplied to the water injection device 157.

When such an evaporative cooling operation continues over a certain period of time, a temperature of the evaporative water gradually rises to reach an appropriate temperature state for bacterial growth, and a configuration of the conventional evaporative cooler 150 has a structure in which an outlet of the dry channel 151, an inlet of the wet channel 152, an indoor air supply side, and the drain plate 310 communicate with each other, and thus the evaporative water stored in the drain plate 310 and air evaporated at the wet channel 152 may flow into the interior through an air supply side such that there is a problem in that grown bacteria may contaminate indoor air.

DISCLOSURE

Technical Problem

The present invention has been proposed in order to resolve the above-described problems, and it is an objective of the present invention to provide an evaporative cooler capable of preventing contamination of indoor air by spatially separating an air supply passage from a bleeding passage to fundamentally block evaporative water and evaporative air, which pass through the bleeding passage, from flowing into an interior.

It is another objective of the present invention to provide an operating method for an evaporative cooler, which is capable of preventing bacterial growth in a wet channel and a water tank.

Technical Solution

To achieve the above-described objectives, an evaporative cooler (1) of the present invention includes a main body (10) including an air supply inlet (11) into which indoor air and outdoor air flow, an air supply outlet (12) through which the indoor air and the outdoor air flowing into through the air supply inlet (11) are discharged to an interior through an air supply passage (P1) via a dry channel (DC), and a bleeding inlet (13) into which the indoor air flows, and a bleeding outlet (14) through which the indoor air flowing into through the bleeding inlet (13) is discharged to an outside through a bleeding passage (P2) via a wet channel (WC); and a heat exchange unit (20) having the dry channel (DC) and the wet channel (WC) and configured to cool air passing through the dry channel (DC) by using evaporative latent heat of water via the wet channel (WC), wherein the air supply passage (P1) and the bleeding passage (P2) are spatially separated from each other such that a fluid passing through the bleeding passage (P2) is prevented from being mixed to flow into the air supply passage (P1) and flow in the interior.

A passage separation guide (15) configured to block a fluid communication may be provided between a dry channel outlet (DCO) and a wet channel inlet (WCI).

A flow amount of the outdoor air flowing into the air supply passage (P1) through the air supply inlet (11) and discharged to the interior may be set the same as a flow amount of the indoor air flowing into the bleeding passage (P2) through the bleeding inlet (13) and discharged to the outside.

The dry channel (DC) and the wet channel (WC) may be alternately formed to be adjacent to each other between a plurality of partition plates (21) spaced apart at regular intervals.

The dry channel (DC) may include a dry channel fin (22) having a passage formed to allow air flowing into through the air supply inlet (11) to flow toward the air supply outlet (12), and first passage guides (23a and 23b) configured to seal one side of a lower portion of the dry channel fin (22) and the other side of an upper portion thereof and form the air supply passage (P1) between the plurality of partition plates (21), and the wet channel (WC) may include a wet channel fin (24) having a passage formed to allow air flowing into through the bleeding inlet (13) to flow toward the bleeding outlet (14) and in which evaporation occurs by the wet channel fin (24) being in contact with supplied water, and second passage guides (25a and 25b) configured to seal one side of a lower portion of the wet channel fin (24) and one side of an upper portion thereof and form the bleeding passage (P2) between the plurality of partition plates (21).

A water tank (50) may be provided to collect water which is not evaporated while passing through the wet channel (WC) and to circulate and supply the collected water to the wet channel (WC), and an ultraviolet sterilization lamp (51) may be provided inside the water tank 50.

The water tank (50) may be provided to collect water which is not evaporated while passing through the wet channel (WC) and to circulate and supply the collected water to the wet channel (WC), and a bleeding blower (40) may be provided at the bleeding inlet (13) to pressure transfer air passing through the bleeding passage (P2) so as to dry the wet channel (WC) and the water tank (50).

An operating method for an evaporative cooler according to the present invention, the operating method includes operating an air supply blower (30) configured to pressure transfer air to the air supply passage (P1) and the bleeding blower (40) configured to pressure transfer air to the bleeding passage (P2) for a set time (T1) when the evaporative cooler starts a cooling operation; and removing impurities residing in the air supply passage (P1) and the bleeding passage (P2).

Further, the operating method may include stopping a supply of water to the wet channel (WC) when the evaporative cooler continuously performs a cooling operation and a set time (T2) passes from when the cooling operation is started; draining water in the water tank (50) in which the water circulated through and supplied to the wet channel (WC) is stored; operating the bleeding blower (40) configured to pressure transfer air to the bleeding passage (P2) for a set time (T3) to dry the wet channel (WC) and the water tank (50); and resuming the supply of water to the wet channel (WC) after supplying the water to the water tank (50).

Furthermore, the operating method may include stopping a supply of water to the wet channel (WC) when the evaporative cooler terminates a cooling operation; draining water in the water tank (50) in which the water circulated through and supplied to the wet channel (WC) is stored; and operating the bleeding blower (40) configured to pressure transfer air to the bleeding passage (P2) for a set time (T5) to dry the wet channel (WC) and the water tank (50).

Advantageous Effects

In accordance with the evaporative cooler according to the present invention, an air supply passage and a bleeding passage are configured to be spatially separated from each other to fundamentally block evaporative water and evaporative air passing through a wet channel from flowing into an interior side such that contamination of indoor air can be prevented, and a comfortable indoor environment can be maintained.

Further, an ultraviolet sterilization lamp is installed inside a water tank in which evaporative water circulated through and supplied to the wet channel is stored such that bacterial growth in the water tank can be prevented.

In accordance with the operating method for an evaporative cooler according to the present invention, an air supply blower and a bleeding blower are operated for a set time when the evaporative cooler starts a cooling operation such that impurities such as dust and the like, which reside in the air supply passage and the bleeding passage, can be effectively removed before water is supplied and thus an evaporative cooling is performed.

Further, when the evaporative cooler continuously performs a cooling operation and then a set time passes, after the water in the water tank is drained, the bleeding blower is operated to dry the wet channel and the water tank for a set time, and then the cooling operation is resumed after drying is completed such that bacterial growth can be prevented.

Furthermore, when the evaporative cooler begins to terminate the cooling operation, after the water in the in the water tank is drained, the bleeding blower is operated to dry the wet channel and the water tank for a set time, and then the cooling operation is terminated after drying is completed such that bacterial growth can be prevented even after the cooling operation is terminated.

DESCRIPTION OF DRAWINGS

FIG. 1 is a configurational diagram of an evaporative cooler provided in a conventional dehumidifying cooling apparatus.

FIG. 2 is a configurational diagram of an evaporative cooler according to the present invention.

FIG. 3 is a diagram illustrating a flow direction of fluid passing through a dry channel and a wet channel in a heat exchange unit of the evaporative cooler according to the present invention.

FIG. 4 is a perspective view illustrating a portion of the heat exchange unit of the evaporative cooler according to the present invention.

FIG. 5 is an exploded perspective view of FIG. 4.

FIG. 6 is a diagram illustrating the flow direction of the fluid passing through the dry channel.

FIG. 7 is a diagram illustrating the flow direction of the fluid passing through the wet channel.

FIG. 8 is a flowchart of an operating method for an evaporative cooler when the evaporative cooler starts a cooling operation and performs the cooling operation continuously.

FIG. 9 is a flowchart of the operating method for an evaporative cooler when the evaporative cooler terminates the cooling operation.

Description of Reference Numerals

| | | | |
|---|---|---|---|
| 1: | evaporative cooler | 10: | main body |
| 11: | air supply inlet | 12: | air supply outlet |
| 13: | bleeding inlet | 14: | bleeding outlet |
| 15: | passage separation guide | 20: | heat exchange unit |
| 30: | air supply blower | 40: | bleeding blower |

-continued

Description of Reference Numerals

| 50: | water tank | 51: | ultraviolet sterilization lamp |
|---|---|---|---|
| 60: | water supply valve | 61: | water supply line |
| 70: | drainage valve | 71: | drainage line |
| 80: | water pump | 81: | water injection line |
| 90: | water injection device | P1: | air supply passage |
| P2: | bleeding passage | 310: | drain plate |
| 150: | cooler | 151: | dry channel |
| 152: | wet channel | 157: | water injection device |

MODES OF THE INVENTION

Hereinafter, configurations and operations for preferred embodiments of the present invention will be described in detail with reference to the accompanying drawings.

Referring to FIGS. 2 to 7, an evaporative cooler 1 according to the present invention includes a main body 10 having an air supply passage P1 and a bleeding passage P2 therein; and a heat exchange unit 20 provided inside the main body 10, having a dry channel DC communicating with the air supply passage P1 and a wet channel WC communicating with the bleeding passage P2, and configured to cool air passing through the dry channel DC using evaporative latent heat of water passing through the wet channel WC.

The air supply passage P1 and the bleeding passage P2 are configured to be spatially completely separated by a passage separation guide 15 such that a fluid communication between a fluid flowing through the air supply passage P1 and a fluid flowing through the bleeding passage P2 is blocked.

An air supply inlet 11 is formed at the other side of a lower portion of the main body 10, and an air supply outlet 12 is formed at one side of an upper portion of the main body 10.

Indoor air and outdoor air flow into the air supply inlet 11, and the indoor air and the outdoor air flowing in through the air supply inlet 11 pass through the air supply outlet 12 and the air supply passage P1 via the dry channel DC of the heat exchange unit 20 and are discharged to an interior.

An air supply blower 30 may be provided at the air supply inlet 11 to pressure transfer the air passing through the air supply passage P1, and a filter 12a may be provided at the air supply outlet 12 to filter impurities, such as dust and the like, contained in the air supplied to the interior.

A bleeding inlet 13 is formed at the other side of the upper portion of the main body 10, and a bleeding outlet 14 is formed at one side of the lower portion of the main body 10.

The indoor air flows into the bleeding inlet 13, and the indoor air flowing into through the bleeding inlet 13 passes through the bleeding outlet 14 and the bleeding passage P2 via the wet channel WC of the heat exchange unit 20 and is discharged to the outside.

As one example, the indoor air may be set to 70% of a total flow amount of the air flowing into the air supply passage P1 through the air supply inlet 11 and discharged to the interior, and the outdoor air may be set to 30% to the total flow amount thereof. A flow amount of air flowing into the bleeding passage P2 through the bleeding inlet 13 and discharged to the outside is set the same as a flow amount of the outdoor air flowing into the air supply passage P1 through the air supply inlet 11 and discharged to the interior.

That is, it is configured to supplement the indoor air from the outside through the air supply passage P1 by the flow amount of the indoor air discharged to the outside through the bleeding passage P2.

Meanwhile, a water tank 50 is provided at one side of the lower portion of the main body 10 to collect water which is not evaporated while passing through the wet channel WC and to circulate and supply the collected water to the wet channel WC. An ultraviolet sterilization lamp 51 may be provided inside the water tank 50 to sterilize bacteria contained in the water which is accommodated in the water tank 50.

A water supply line 61 configured to supplement and supply water and a water supply valve 60 configured to open and close a passage of the water supply line 61 are provided at one side of a lower portion of the water tank 50, and a drainage line 71 configured to drain water and a drainage valve 70 configured to open and close a passage of the drainage line 71 are provided at the other side of the lower portion of the water tank 50.

Further, a water injection line 81 is connected to the water tank 50 to supply water to a water injection device 90 configured to inject the water onto the wet channel WC, and a water pump 80 is installed at the water injection line 81 to pressure transfer the water.

The water injected from the water injection device 90 flows down along the wet channel WC, absorbs heat from air passing through a dry channel DC disposed to be adjacent to the wet channel WC while being evaporated by air passing through the wet channel WC, and cools the air passing through the dry channel DC.

The air supply passage P1 and the bleeding passage P2 in the heat exchange unit 20 will be described below.

As indicated by solid arrows in FIG. 3, the air supply passage P1 is formed along a path connecting a dry channel inlet DCI communicating with the air supply inlet 11 and disposed at the other side of a lower portion of the heat exchange unit 20, the dry channel DC inside the heat exchange unit 20, and a dry channel outlet DCO disposed at one side of an upper portion of the heat exchange unit 20 and communicating with the air supply outlet 12.

As indicated by dotted arrows in FIG. 3, the bleeding passage P2 is formed along a path connecting a wet channel inlet WCI communicating with the bleeding inlet 13 and disposed at the other side of the upper portion of the heat exchange unit 20, the wet channel WC inside the heat exchange unit 20, and a wet channel outlet WCO disposed at one side of the lower portion of the heat exchange unit 20 and communicating with the bleeding outlet 14.

Further, the passage separation guide 15 is installed between an air supply space S1 in which the dry channel outlet DCO is disposed and a bleeding space S2 in which the wet channel inlet WCI is disposed such that the air supply passage P1 and the bleeding passage P2 are spatially completely separated from each other. Consequently, evaporative water and evaporative air flowing along the bleeding passage P2 are blocked from being mixed to flow into the air supply passage P1. Therefore, even when the evaporative water and the evaporative air are contaminated, the evaporative water and the evaporative air can be prevented from flowing into an interior side such that contamination of the indoor air caused by the inflow of the evaporative water and the evaporative air can be prevented.

A configuration and operation of the heat exchange unit 20 according to one embodiment will be described below with reference to FIGS. 4 to 6.

In the heat exchange unit 20, a dry channel DC and a wet channel WC are alternately formed to be adjacent to each other between a plurality of partition plates 21 spaced apart at regular intervals. FIGS. 4 and 5 illustrate two dry channels DC and a wet channel WC disposed between the two dry channels DC.

The dry channel DC includes a dry channel fin 22 having a passage formed to allow air flowing into through the air supply inlet 11 to flow toward the air supply outlet 12, and first passage guides 23a and 23b configured to seal one side of a lower portion of the dry channel fin 22 and the other side of an upper portion thereof and form the air supply passage P1 between the plurality of partition plates 21.

Consequently, as indicated by solid arrows in FIG. 6, the air supply passage P1 is formed along a path from the other side of the lower portion of the heat exchange unit 20 toward the one side of the upper portion thereof.

Further, the air flowing along the air supply passage P1 is prevented from being mixed to flow into the bleeding passage P2 by the first passage guides 23a and 23b.

The wet channel WC includes a wet channel fin 24 having a passage formed to allow air flowing into through the bleeding inlet 13 to flow toward the bleeding outlet 14 and in which evaporation occurs by the wet channel fin 24 being in contact with supplied water, and second passage guides 25a and 25b configured to seal the other side of a lower portion of the wet channel fin 24 and one side of an upper portion thereof and form the bleeding passage P2 between the plurality of partition plates 21.

Consequently, as indicated by dotted arrows in FIG. 7, the bleeding passage P2 is formed along a path from the other side of the upper portion of the heat exchange unit 20 toward the one side of the lower portion thereof.

Further, evaporative water and evaporative air flowing along the bleeding passage P2 is prevented from being mixed to flow into the air supply passage P1 by the second passage guides 25a and 25b.

As described above, the evaporative cooler 1 of the present invention is configured such that the air supply passage P1 and the bleeding passage P2 are spatially separated from each other, so that the total flow amount of the evaporative water and the evaporative air flowing along the bleeding passage P2 is discharged to the outside, and the evaporative water and the evaporative air are fundamentally prevented from flowing into the interior such that contamination of the indoor air due to the inflow of contaminated evaporative water and contaminated evaporative air into the interior.

An operating method for the evaporative cooler, which is configured as described above, according to the present invention will be described below with reference to FIGS. 8 and 9.

Referring to FIG. 8, when the evaporative cooler begins to start a cooling operation (S1), the drainage valve 70 is closed and the water supply valve 60 is opened to supply water into the water tank 50 (S2). Then, the air supply blower 30 and the bleeding blower 40 are operated for a set time T1 to remove impurities such as dust and the like residing in the air supply passage P1 and the bleeding passage P2 (S3 and S4). As one example, the set time T1 may be set to one to two minutes.

In this case, the impurities residing in the air supply passage P1 are filtered by the filter 12a provided at the air supply outlet 12 and are prevented from flowing into the interior side, and the impurities residing in the bleeding passage P2 are discharged to the outside through the bleeding outlet 14.

When the set time T1 passes, the water pump 80 and the water injection device 90 are operated to inject water toward the wet channel WC such that the cooling operation is performed (S5 and S6).

When a set time T2 passes while the cooling operation is continuously performed (S7), the operation of the water pump 80 is stopped to pause the cooling operation (S8). The set time T2 may be set to one to four hours. The set time T2 is predetermined in consideration of a time in which bacteria can generate and grow in the water tank 50 and the wet channel WC due to a rise in temperature of the evaporative water resulting from the cooling operation. Subsequently, the water supply valve 60 is closed, and the drainage valve 70 is opened to drain the water in the water tank 50 (S9).

Then, the air supply blower 30 and the bleeding blower 40 are operated for a set time T3 to dry the insides of the wet channel WC and the water tank 50 (S10). In this case, only the bleeding blower 40 may be operated and the air supply blower 30 may be stopped. As one example, the set time T3 may be set to fifteen minutes.

After the set time T3 passes and the wet channel WC and the water tank 50 are sufficiently dried, the drainage valve 70 is closed and the water supply valve 60 is opened to supplement water in the water tank 50 for a set time T4 (S11 and S12). Then, after the set time T4 passes, the water pump 80 and the water injection device 90 are operated to resume the cooling operation.

As described above, when the cooling operation is continuously performed, the water in the water tank 50 is circulated for the set time T2 to perform the cooling operation, the water in the water tank 50 is drained after the set time T2 passes, the wet channel WC and the water tank 50 are dried, and the cooling operation is resumed by supplementing the water in the water tank 50 such that the bacterial growth in the wet channel WC and the water tank 50 can be prevented.

Referring to FIG. 9, when the evaporative cooler begins to terminate the cooling operation and a user inputs a command for terminating the cooling operation (S13), the operation of the water pump 80 is stopped (S14), the water supply valve 60 is closed, and the drainage valve 70 is opened such that the water in the water tank 50 is drained (S15).

Subsequently, the operations of the air supply blower 30 and the bleeding blower 40 are maintained for a set time T5 such that the wet channel WC and the water tank 50 are dried (S16 and S17). In this case, only the bleeding blower 40 may be operated and the air supply blower 30 may be stopped. As one example, the set time T5 may be set to three minutes.

After the set time T5 passes, the operations of the air supply blower 30 and the bleeding blower 40 are stopped (S18), and the operation of the dehumidifying cooler is terminated.

As described above, when the cooling operation of the evaporative cooler is terminated, the water in the water tank 50 is drained, the wet channel WC and the water tank 50 are dried for the set time T5, and the operation of the dehumidifying cooler is terminated such that the bacterial growth in the evaporative cooler can be prevented even when the evaporative cooler does not operate.

The invention claimed is:
1. An evaporative cooler comprising:
a main body (10) including an air supply inlet (11) into which indoor air and outdoor air flow, an air supply outlet (12) through which the indoor air and the outdoor air flowing into through the air supply inlet (11) are discharged to an interior through an air supply passage

(P1) via a dry channel (DC), and a bleeding inlet (13) into which the indoor air flows, and a bleeding outlet (14) through which the indoor air flowing into through the bleeding inlet (13) is discharged to an outside through a bleeding passage (P2) via a wet channel (WC);
a heat exchange unit (20) having the dry channel (DC) and the wet channel (WC) and configured to cool air passing through the dry channel (DC) by using evaporative latent heat of water via the wet channel (WC);
a water tank (50), wherein the water tank collects water which is not evaporated while passing through the wet channel (WC), and circulates and supplies the collected water to the wet channel (WC); and
a bleeding blower (40) provided at the bleeding inlet (13), wherein the bleeding blower pressures transfer air passing through the bleeding passage (P2) and, as a result, dries the wet channel (WC) and the water tank (50),
wherein the air supply passage (P1) and the bleeding passage (P2) are spatially separated from each other such that a fluid passing through the bleeding passage (P2) is prevented from being mixed to flow into the air supply passage (P1) and flow in the interior.

2. The evaporative cooler of claim 1, wherein a passage separation guide (15) is provided between a dry channel outlet (DCO) and a wet channel inlet (WCI) and permanently blocks a fluid communication between a fluid flowing through the air supply passage and a fluid flowing through the bleeding passage.

3. The evaporative cooler of claim 1, wherein a flow amount of the outdoor air flowing into the air supply passage (P1) through the air supply inlet (11) and discharged to the interior is set the same as a flow amount of the indoor air flowing into the bleeding passage (P2) through the bleeding inlet (13) and discharged to the outside.

4. The evaporative cooler of claim 1, wherein the dry channel (DC) and the wet channel (WC) are alternately formed to be adjacent to each other between a plurality of partition plates (21) spaced apart at regular intervals.

5. The evaporative cooler of claim 4, wherein:
the dry channel (DC) includes a dry channel fin (22) having a passage formed to allow air flowing into through the air supply inlet (11) to flow toward the air supply outlet (12), and first passage guides (23a and 23b) configured to seal one side of a lower portion of the dry channel fin (22) and the other side of an upper portion thereof and form the air supply passage (P1) between the plurality of partition plates (21), and
the wet channel (WC) includes a wet channel fin (24) having a passage formed to allow air flowing into through the bleeding inlet (13) to flow toward the bleeding outlet (14) and in which evaporation occurs by the wet channel fin (24) being in contact with supplied water, and second passage guides (25a and 25b) configured to seal the other side of a lower portion of the wet channel fin (24) and one side of an upper portion thereof and form the bleeding passage (P2) between the plurality of partition plates (21).

6. The evaporative cooler of claim 1, wherein:
a water tank (50) is provided to collect water which is not evaporated while passing through the wet channel (WC) and to circulate and supply the collected water to the wet channel (WC), and
an ultraviolet sterilization lamp (51) is provided inside the water tank 50.

7. An operating method for an evaporative cooler according to claim 1, the operating method comprising:
operating an air supply blower (30) configured to pressure transfer air to the air supply passage (P1) and the bleeding blower (40) configured to pressure transfer air to the bleeding passage (P2) for a set time (T1) when the evaporative cooler starts a cooling operation; and
removing impurities residing in the air supply passage (P1) and the bleeding passage (P2).

8. An operating method for an evaporative cooler according to claim 1, the operating method comprising:
stopping a supply of water to the wet channel (WC) when the evaporative cooler continuously performs a cooling operation and a set time (T2) passes from when the cooling operation is started;
draining water in the water tank (50) in which the water circulated through and supplied to the wet channel (WC) is stored;
operating the bleeding blower (40) configured to pressure transfer air to the bleeding passage (P2) for a set time (T3) to dry the wet channel (WC) and the water tank (50); and
resuming the supply of water to the wet channel (WC) after supplying the water to the water tank (50).

9. An operating method for an evaporative cooler according to claim 1, the operating method comprising:
stopping a supply of water to the wet channel (WC) when the evaporative cooler terminates a cooling operation;
draining water in the water tank (50) in which the water circulated through and supplied to the wet channel (WC) is stored; and
operating the bleeding blower (40) configured to pressure transfer air to the bleeding passage (P2) for a set time (T5) to dry the wet channel (WC) and the water tank (50).

* * * * *